United States Patent [19]
Bederman

[11] Patent Number: 4,567,590
[45] Date of Patent: Jan. 28, 1986

[54] MESSAGE STRIPPING PROTOCOL FOR A RING COMMUNICATION NETWORK

[75] Inventor: Seymour Bederman, Raleigh, N.C.

[73] Assignee: International Business Machines Corp., Armonk, N.Y.

[21] Appl. No.: 565,789

[22] Filed: Dec. 27, 1983

[51] Int. Cl.[4] .............................................. H04J 3/16
[52] U.S. Cl. ........................................ 370/86; 370/89
[58] Field of Search ...................... 370/85, 86, 89, 94; 340/425.05

[56] References Cited

U.S. PATENT DOCUMENTS

| | | | |
|---|---|---|---|
| 4,227,178 | 10/1980 | Gergaud et al. | 370/86 |
| 4,335,426 | 6/1982 | Maxwell et al. | 370/86 |
| 4,373,183 | 2/1983 | Means et al. | 370/85 |
| 4,489,379 | 12/1984 | Lanier et al. | 370/86 |
| 4,507,777 | 3/1985 | Tucker et al. | 370/86 |

OTHER PUBLICATIONS

"Multi-Peer Access Loop Communication System", by H. Y. Juliusburger et al., IBM Technical Disclosure Bulletin, vol. 22, No. 10, Mar. 1980.
"A Reliable Token-Ring System for Local-Area Communication", by W. Bux et al., IBM Zurich Research Labs., 1981.

Primary Examiner—Douglas W. Olms
Assistant Examiner—Kenneth I. Rokoff
Attorney, Agent, or Firm—Joscelyn G. Cockburn

[57] ABSTRACT

A plurality of stations are used to strip expendable messages from a serial ring communication network. One station uses either the destination address field or the source address field as the basis for removing a portion of the message. Another station uses the status of a control indicia as the basis for removing the remaining portion of the message from the ring. By distributing the stripping function, between multiple stations on the ring, a significant reduction in ring latency is achieved.

19 Claims, 13 Drawing Figures

APPENDED FRAGMENTS

S-DEL BAUD SEQUENCE

E-DEL BAUD SEQUENCE

IDLE (IMPLICIT ABORT) SEQUENCE

START OF FRAME SEQUENCE FOR REGISTER INSERTION RING

MESSAGE FRAGMENTS

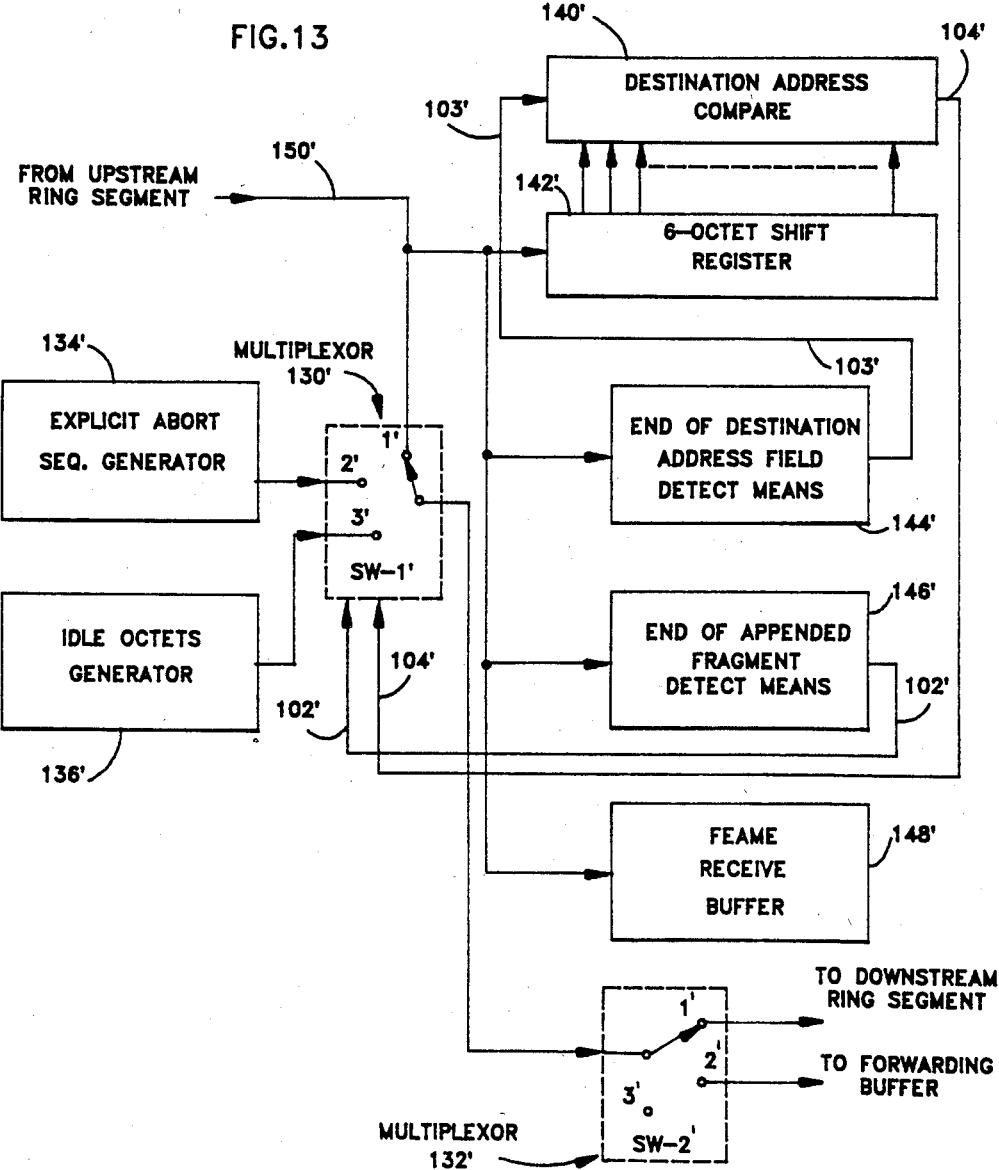

MESSAGE STRIPPING PROTOCOL FOR A RING COMMUNICATION NETWORK

CROSS REFERENCE TO RELATED APPLICATION

The present application relates to application Ser. No. 565,244, filed Dec. 23, 1983 in the name of Seymour Bederman, entitled "Token Ring with Secondary Transmit Opportunities," and assigned to the same assignee. The reference application describes protocols for accessing a loop communication network. The present invention describes a protocol for stripping expendable messages from the loop.

BACKGROUND OF THE INVENTION

(1) Field of the Invention

The invention relates to communications networks in general and more particularly to protocol for stripping data from the network.

(2) Prior Art

The use of serial or ring communication networks for transferring data is well known in the prior art. Such networks consist of a set of stations serially connected to a communication medium. Information is transferred sequentially, bit by bit, from one station to the next. The inactive stations are bypassed while the active stations regenerate and repeat each bit. Furthermore, the stations are used as the means for attaching one or more devices (terminals, work station, computers, display, etc.) which communicate with other devices on the network.

An originating station transfers its information (message) onto the ring. The message circulates, passes one or more intermediate stations, until it arrives at the destination station where it is copied. In some implementations, the destination station strips the message from the ring. In other implementations, the message remains on the ring until it arrives at the originating station where it is stripped from the ring. Usually, the ring also includes a monitor station which is responsible for stripping messages that have not been stripped by the station normally responsible to perform the stripping. In addition, the monitor station may perform other types of housekeeping functions for the ring.

An access method protocol is a necessary element for the above-described ring network. The protocols are the mechanisms which enable a station to transmit on the ring. Stated another way, an access protocol gives a station the right to place its messages for transmission on the ring.

The prior art uses several different types of access method protocols. The so-called "register" insert access protocol and "token" insert access protocols are representative of the prior art. Whenever the register insert access protocol is used a station seizes the opportunity to transmit when there is an "idle" signal on the ring. With the token insert access protocol a station has an opportunity to transmit whenever it receives a free token. The free token is usually generated by an upstream station.

Although the prior art access method protocols work well for the intended purpose, they are plagued by certain defects which tend to reduce the overall efficiency of the ring networks. The register insert protocols require the introduction of relatively long delays in the ring in order that expendable messages can be successfully stripped from the ring. The delay lengthens the time that is needed to process a message. Likewise, the "token" access protocol allows only one message to be on the ring at any particular instant of time. When the messages are relatively short, compared to the latency of the ring, only a fraction of the available bandwidth is used. Failure to use all of the available bandwidth reduces the efficiency of the ring because a series of idle patterns must be transmitted to fill up the vacancy on the ring.

Another requirement for the above described communication networks is that message fragments and exhausted or expendable messages must be removed or stripped from the ring. The message stripping can take place at some time after the message has reached its destination node. Stripping generally involves either replacing the stripped message with a new message or else replacing the old message with idle patterns. On a register-insertion ring it is desirable to begin stripping early, since this tends to recover a portion of the ring's bandwidth for reuse by another transmitting station.

In a ring which has a latency that greatly exceeds the duration of the shortest message, and which ring employs an access protocol that allows multiple messages to coexist on the ring, it is desirable for each station that has originated a message to strip this message, after the message has circulated once around the ring, such that the message will not be accepted a second time by a destination station.

A station must be able to distinguish between messages that require stripping actions by this station and those messages which require stripping actions by another station. In order to make this distinction, some serial buffering of a message may be required. It is desirable to keep such buffering to a minimum in order to reduce costs and to reduce added ring latency.

The prior art uses different types of stripping protocols to dispose of exhausted messages and/or fragments. One stripping protocol requires the target station to strip each message that it receives. This approach recovers bandwidth promptly. However, this approach is unsuitable for broadcast messages, destined for multiple target nodes. Also, this approach does not provide feedback to the original sending station.

Another stripping protocol requires that the sending station strip each message which it has sent, after this message comes back around the ring. This approach is suitable when the access protocol is such that no messages originated by another station can arrive, at the sending station, prior to the return of any messages which this sending station has originated. This approach can also be used if the sending station is designed so as to insert sufficient buffer delay into the ring such that the sending station can examine the source address of an arriving message, and then determine whether this arriving message should be stripped, or else should be permitted to continue on its way around the ring. Since the location of the source address field may occcur many bytes after the start delimiter field, this approach adds undesirable delay to the ring and also requires the addition of costly buffering facilities for each station.

It is worthwhile noting that the prior art uses a single station to strip expendable messages from the ring. Due to the single station approach the above-described prior art stripping techniques are plagued with the above-described problems.

SUMMARY OF THE INVENTION

It is a general object of the present invention to provide a novel stripping technique which is more efficient than was heretofore possible.

It is a more specific object of the present invention to use a plurality of stations to perform the stripping function.

Briefly, the method of the present invention distributes the stripping function between at least two stations on the ring. One of these stations is either the station which originally transmits the message, or else is the destination station, and the other station is the ring's monitor station.

The station which originally transmits the message monitors the incoming message at its input and when it recognizes its own address in the source address field, it begins to strip the message by outputting idle pattern on the ring. The process of outputting idle pattern continues until the station receives an idle or start delimiter pattern at its input. The portion of the message that is stripped by the originating station is termed the appended portion.

The message fragment (that is, the portion of the message that that was not stripped by the originating station) is removed by the monitor station. On the first passage of the message through the monitor station, the "Monitor Count" (MC) Bit in the PCF-0 field is set to "1". On the second passage through the monitor station, that station recognizes that the MC bit is set to "1" and strips the message fragment.

In one feature of the present invention the destination station strips the appended portion of the message from the ring.

The foregoing features and advantages of the invention will be more fully described in the accompanying drawings.

BRIEF DESCRIPTION OF THE DRAWINGS

FIG. 13 shows a block diagram for the stripping elements of a destination station.

DESCRIPTION OF THE PREFERRED EMBODIMENT

Figure 1:
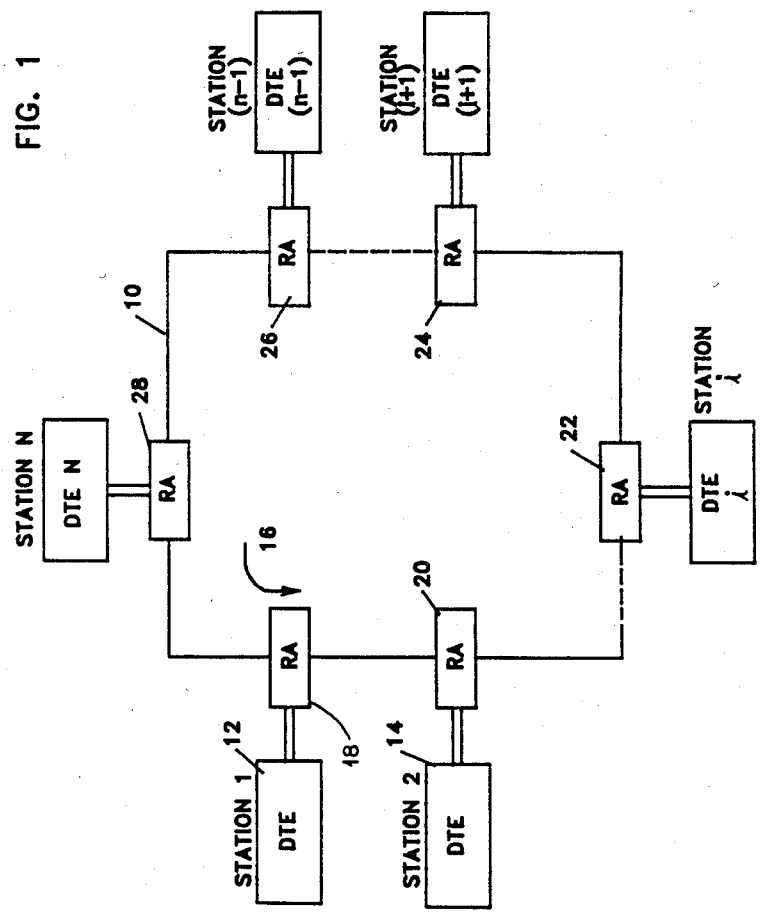
FIG. 1 shows a block diagram of a ring communications network in which the present invention may be used.

FIG. 1 shows a serial loop communications system in which the stripping function of the present invention may be employed. The serial ring communication system includes a closed loop unidirectional transmission medium identified by numeral 10. The ring interconnects a plurality of data terminal equipment (DTE) or data terminal units (DTUs) 12, 14 . . . i, i+1, . . . n−1 and n. Each data terminal unit may include one or several devices such as display terminals, microcomputers, data collectors, word processing units, telephone type apparatus, etc. The function of the system is to exchange or distribute data between these devices. Data transmission, in the system, is unidirectional and may be shown in the direction of arrow 16. The data terminal equipment is connected to the ring by ring adapter 18, 20, 22, 24, 26 and 28, respectively. The structure and function of the ring adapters are identical. The purpose is to receive data from and transmit data onto the ring. To this end the ring adapter performs ring protocol functions which enable the free movement of data onto the ring without impacting the design of the data terminal equipment.

Each ring adapter and its connected data terminal equipment are hereinafter referred to as a station. For example, station 1 includes data terminal equipment 12 and ring attachment 18. Likewise, station 2 includes data terminal equipment 14 and ring adapter 20 and so forth. In addition, the communication system is reconfigurable in that if a station is down it does not bring the entire system to a halt. The system is reconfigured so that it bypasses the defective station and/or the defective ring segment (in the event that there is a break in the communication medium) and the functional stations still have the opportunity of operating. A more detailed description of the serial data communication system of FIG. 1 for illustrating the environment in which the invention may be practiced can be found in a copending patent application filed by P. A. Janson et al, titled "Method of Transmitting Information between Stations Attached to a Unidirectional Transmission Ring," Ser. No. 326,291, and assigned to the same assignee as this application. The Janson et al application is incorporated herein by reference.

As will be described in greater detail hereinafter, the task of disposing of expendable messages is assigned to one of the stations of FIG. 1 called the "Monitor Station" and either of the stations which originate the message or the station that receives the message. It should be noted that the task of disposing the expendable messages can be assigned to other stations on the ring. In order to implement the stripping function, the ring protocol management (RPM) 36 (FIG. 2) is modified in a manner to be described hereinafter. Suffice it to say that either the station which generates the message or the station which receives the message strips a portion (the appended portion) of exhausted messages following recognition of the station's address and the monitor station strips the message fragment indicated to be exhausted by the state of the monitor control bit in the message header.

Figure 2:
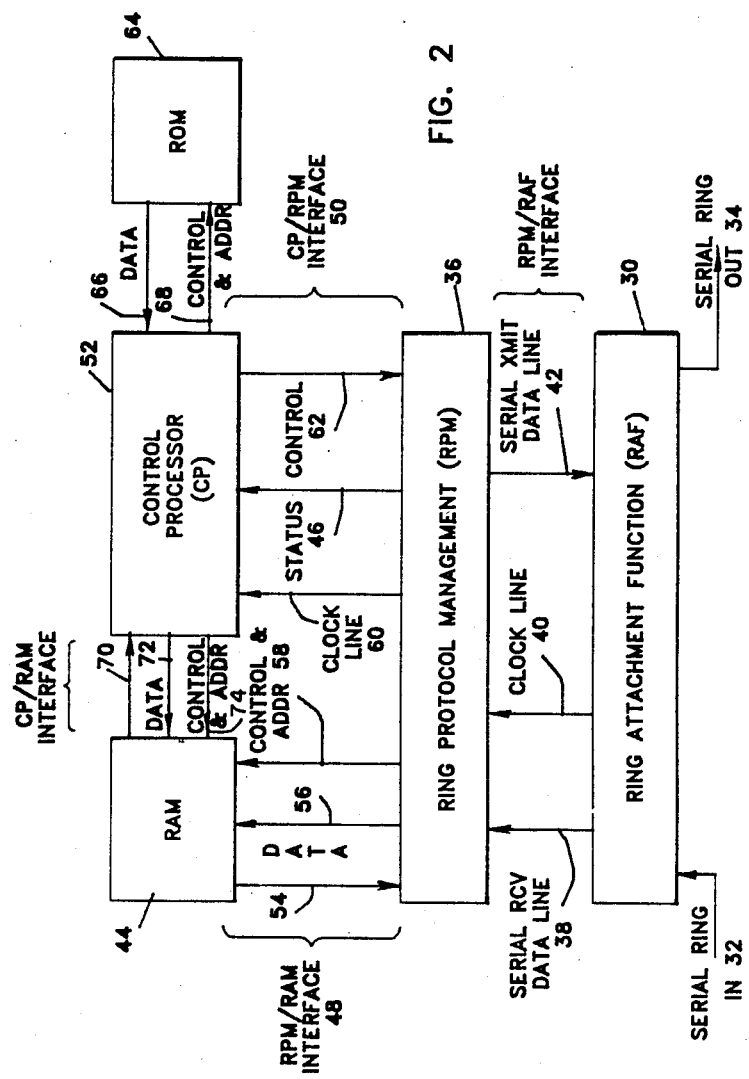
FIG. 2 shows a functional block diagram of a ring adapter.

FIG. 2 shows a functional block diagram of the ring adapter. As stated before, the ring adapter allows a station to accept and dispatch messages on the communication medium of FIG. 1. In order to give each station access to transmit or dispatch data onto the ring, a ring protocol management 36 (FIG. 2) provides access method protocols which give a station the right to transmit when that station is in command of the protocol. One type of access protocol is the above described token protocol. This protocol is described in "The IEEE Project 802 Local Network Standards," Draft C, May 17, 1982 (Section V) and is incorporated herein by reference.

Another type of access protocol is the Secondary Transmit Opportunity (STO) protocol. This protocol enables a token ring to carry multiple messages. The details of the STO protocol are given in the above referenced application which is incorporated herein by reference.

Yet another type of access protocol is the register insert protocol. When a station is using this protocol to gain access to a ring, the station monitors the ring for an "idle" pattern and when the pattern is detected, the station begins to transmit its buffered message onto the ring. A discussion of the protocol is given in an article entitled, "Communication Networks for Digital Information," by J. M. Unk and published in IRE Transactions on Communications Systems (December 1959; pp. 207–214) and is incorporated herein by reference.

The present invention can be used to strip messages from any communication network which utilizes any of the above-described access method protocol. It works well in a register insertion ring and as such will be decribed in that environment. However, this should not be construed as a limitation on the scope of the invention since it is within the skill of one skilled in the art to modify the invention without departing from the scope and spirit of the present invention.

Still referring to FIG. 2, the ring adapter includes a front end section hereinafter called ring attached function (RAF) means 30. This is a grouping of electronic circuitry which performs electrical signal conversion on data which is slated for transmission onto the ring and on data which is received from the ring. Such signal conversions may include modulation and demodulation. Data into RAF 30 is supplied on serial ring in-line 32. Serial ring in-line 32 may be twisted pair conductors, fiber optics links, etc. Similarly, data to be inserted onto the ring is transmitted on serial ring out-line 34. Serial ring out-line 34 may be the same type of conductor as serial ring in-line 32. In addition, the ring attachment function means 30 extracts timing signal from the serial ring data and uses the timing signal for synchronizing the data onto serial ring out-line 34 and into the ring protocol management (RPM) means 36. The RAF also includes the transmitters and receivers which transmit and receive information from the communications ring.

Ring attachment function means 30 is coupled to the ring protocol management means 36 by the ring protocol management/ring attachment function (RPM/RAF) interface. The function of the RPM/RAF interface is to transmit data between the ring protocol management means 36 and the ring attachment function 30. The function which the lines in the interface perform is self-explanatory from the names assigned to each of the lines. For example, serial data which is received on serial ring in line 32 is transmitted as serial received data on conductor 38 to the ring protocol management means 36. Likewise, clock signals on clock line 40 is a timing signal (derived from serial ring data) and is used to synchronize serial data to transfer at the RPM-RAF and serial ring-out interfaces. Likewise, serial transmit (XMIT) data line 42 transmits data signals which are to be synchronized and placed on the transmission ring.

Still referring to FIG. 2, ring protocol management means 36 is a grouping of digital circuitry that performs a bit and byte level function. These functions include encoding and decoding data, handling of the protocols, generating and detecting delimiters, generating and checking cyclic redundancy check (CRC), decoding addresses, etc. When the ring protocol management means 36 is not in a transmit sequence, it repeats serial received data as serial transmit data. When given a formatted message frame in the random access memory 44 and a command to transmit, ring protocol management means 36 monitors the serial ring data for the proper access method sequence which indicates permission to transmit. As described above, either the token sequence or the Secondary Transmit Opportunity sequence can be used to gain access to the ring. The token sequence protocol is fully described in the above-described publication and can be referred to for a detailed description of its operation. The STO protocol is described in the above referenced application. In the case of the register-insertion protocol, the ring protocol management means 36 monitors the serial ring data for the presence of a sequence that indicates an idle condition.

Once a free token or an STO protocol transmission is given, the ring protocol management means 36 inserts the frame in the serial ring-out data stream. In addition, the ring protocol management means 36 strips expendable messages from the ring, generates new protocol to go on the ring, and copies messages which are transmitted to the station.

The ring protocol management means 36 is coupled over RPM/RAM interface 48 and CP/RPM interface 50 to RAM 44 and control processor 52, respectively. Conductors 54 and 56 convey data to and from RAM 44 into the ring protocol management means 36. Control information such as read/write signals, address and timing signals are carried on control and address (control ADDR) line 58 to RAM 44. In the CP/RPM interface 50 clocking information is transmitted on clock line 60 while status information and control information are conducted on conductors 46 and 62, respectively. A more detailed description of the ring adapter is given in application Ser. No. 463,470, entitled "Protocol for Determining Physical Order of Active Stations on a Token Ring" filed Feb. 3, 1983, by E. L. Tucker et al and assigned to the assignee of the present invention. The contents of that application are incorporated herein by reference.

Figure 3:
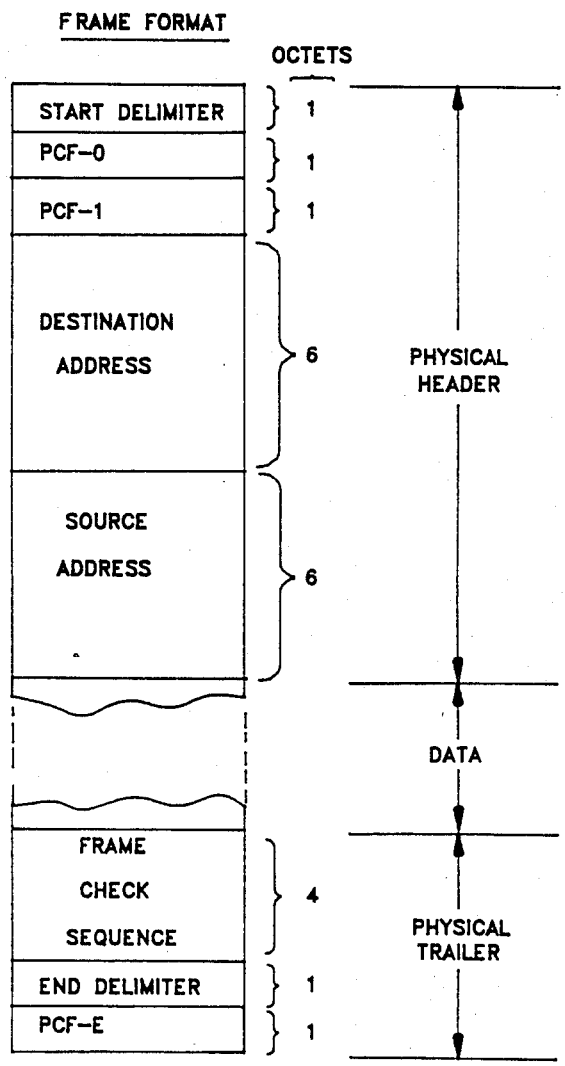
FIG. 3 shows a schematic for the frame format.

FIG. 3 shows the frame format for the messages which are generated and transmitted by a station onto the communication link of FIG. 1. This frame is identical with the message format which is defined by the above referenced IEEE 802 standards. Essentially, the message comprises of a start delimiter field, a PCF-0 field, a PCF-1 field, a destination address field, a source address field, a data field, a frame check sequence field, end delimiter field, and a PCF-E field. The start delimiter, PCF-0, PCF-1, destination address, and source address field are referred to as the physical header. Similarly, the frame check sequence field, end delimiter field and PCF-E field are referred to as the physical trailer. As will be explained hereinafter, the electrical circuitry for the present invention is positioned in the ring protocol management section of the ring adapter to monitor for the respective message fields and based on the presence or absence of the field, enables a station to strip expendable messages from the ring. The number of bytes or octets which are allotted to each field are shown in FIG. 3. For example, the start delimiter field has one octet and so forth.

It should be noted that the PCF-E bit patterns indicates the normal end of a message, while the abort bit pattern (to be described subsequently) indicates an abnormal end of a message. Usually the abort bit pattern is used when a station uses the Secondary Transmit Opportunity Protocol to gain access to a ring and has to discontinue its transmission due to the presence of a high priority token on the line or ring.

Also, depending on the type of protocol the address which is used to initiate stripping may be that of the station which originates the message (originating station) or the station that receives the message (target station). If stripping is done by the target station, the destination address is used to initiate the stripping. Similarly, if the originating station performs the stripping function, the source address is used to initiate the stripping.

As stated above, the stripping function is performed by a plurality of stations. The monitor station strips the message fragments from the ring while the originating station or the receiving station strips the portion of the message that is prefixed by an address (hereinafter called the appended fragment). In the register insert ring the receiving station strips the appended fragment from the ring. The monitor station examines a monitor count (MC) bit in the first byte, following the start delimiter, of each message that arrives at the station. If the MC bit arrives with a value of 0, the monitor station sets the bit to a logical 1, and then retransmits the message. If the MC bit arrives with a value of 1, the monitor station starts to strip the message. The monitor station inserts sufficient delay in the ring such that it can begin stripping with the start delimiter of the message. The monitor station replaces the stripped information with idle patterns. The stripping is continued until the receipt of an idle pattern from the upstream ring segment or the receipt of a start delimiter from the upstream ring segment.

Before describing the circuits which are used for stripping the message fragments from the ring, a description of the various bit sequences which are necessary to the invention will be given. In essence, the monitor station monitors the ring and when it detects one of the particular bit patterns (to be described), the station begins to strip the message fragment from the ring.

Figure 5:
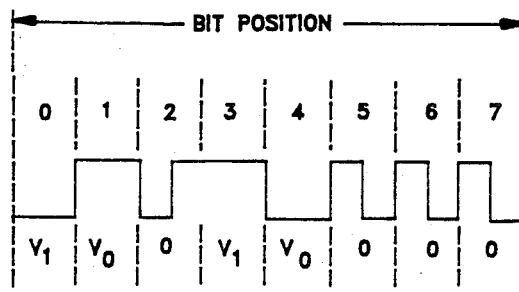
FIG. 5 shows a graphical representation of an S-DEL baud sequence.
Figure 6:
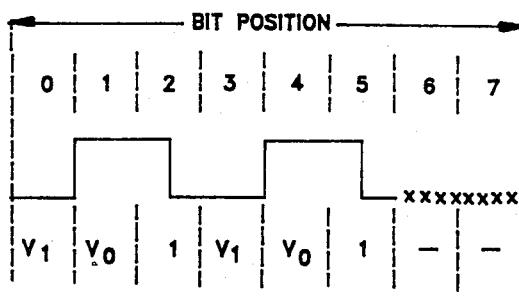
FIG. 6 shows a graphical representation of an E-DEL baud sequence.
Figure 7:
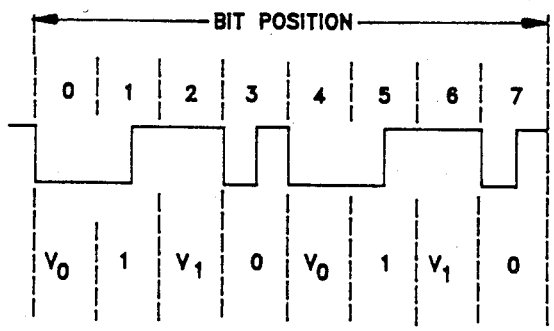
FIG. 7 shows a graphical representation of an idle (implicit abort) sequence.

FIGS. 5, 6 and 7 show three 16-baud sequences that include code violations. These sequences can be used to distinguish the start delimiter, end delimiter and idle octet patterns from the normal data octets (since the normal data octets do not include any code violations). It is assumed that differential Manchester coding is used for the signals that flow on the ring. Information is transmitted as 8-bit octets (where each bit is represented by a two-baud signal pattern). Normally, the two bauds that correspond to a bit have opposite polarities (that is, there is a transition between the two bauds). The pair of bauds that do not have any intervening transitions constitute a "code violation" pattern.

Figure 8:
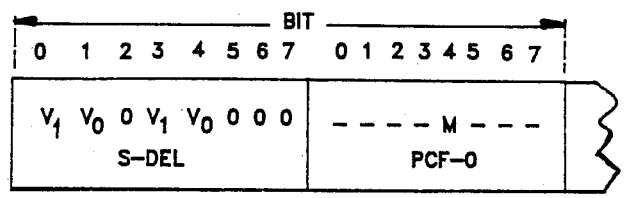
FIG. 8 shows a graphical representation of a start of frame sequence for a register insertion ring.

FIG. 8 is a graphical representation for a start of frame sequence for a register insert ring. The start of frame sequence includes a S-DEL octet concatenated to a PCF-0 octet. The S-DEL represents a start delimiter octet, the V1 and V0 represent Manchester code violations. PCF-0 represents the physical control field and M represents the monitor count bit. The M-bit is used by the monitor station to strip the fragments from the ring. To this end, the first time that a message passes through the monitor station the bit is set to 1. Subsequently, when the message fragment passes through the monitor station, the station checks to see the status of the bit. If it is a "1", then the fragment is stripped from the ring.

Figure 9:
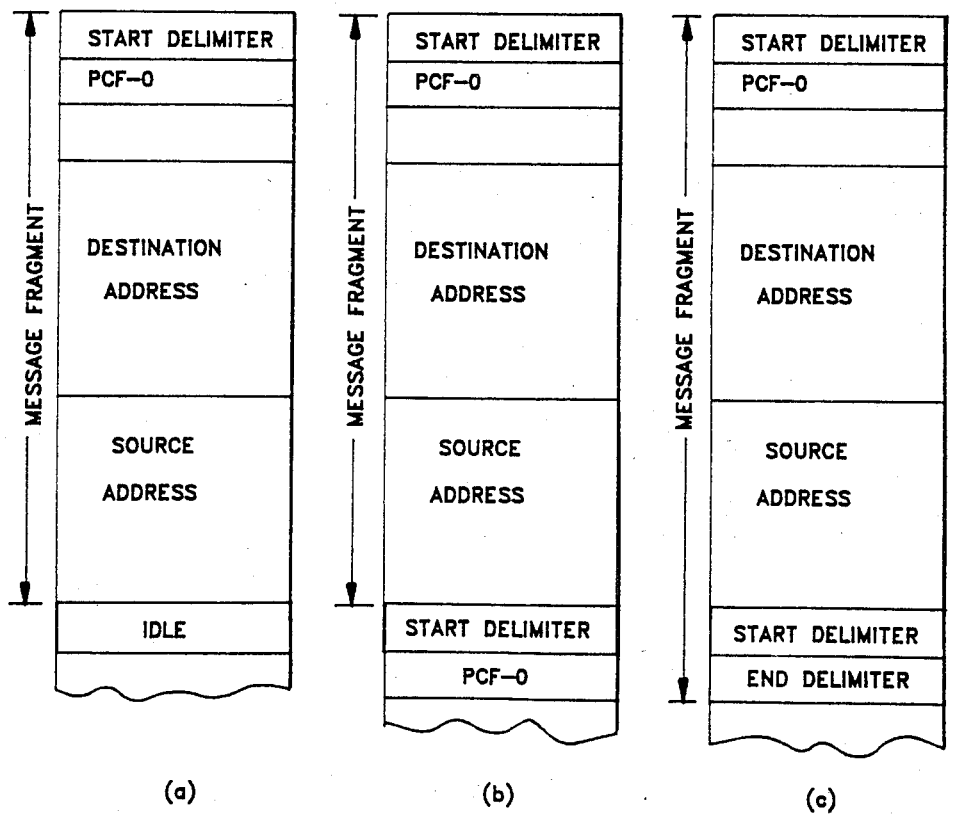
FIGS. 9(a)–9(c) show graphical representations for one type of message fragments.

FIG. 9 shows a schematic representation of different types of message fragments. FIG. 9A shows a fragment with an "implicit abort" which is defined as a fragment that is terminated by an idle octet. FIG. 9B shows a fragment terminating with a start delimiter followed by a PCF-0 octet. This sequence indicates the start of another frame. FIG. 9C shows a fragment terminating by an explicit abort sequence that consists of a start delimiter followed by an end delimiter. This explicit abort sequence is defined in the reference IEEE 802 working paper. As will be explained subsequently, the monitor station buffers the fragment until the status of the monitor count bit is determined whereby the station strips the fragment by outputting an idle pattern and it continues stripping until the end of the message fragment is detected.

Figure 10:
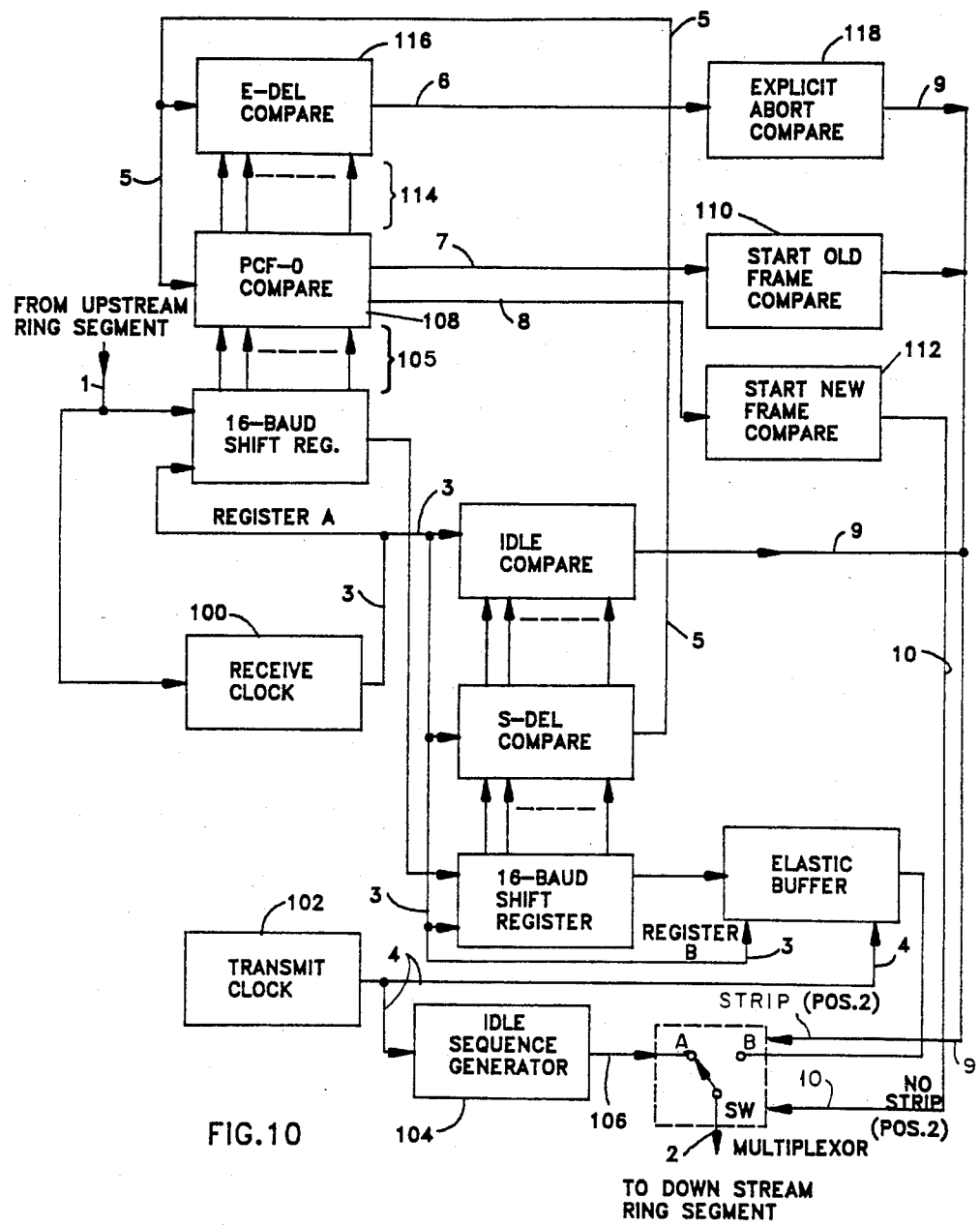
FIG. 10 shows an apparatus for stripping exhausted messages at the monitor station.

FIG. 10 shows a block diagram of a circuit which can be implemented in the monitor station of a ring communication system so that the message fragment can be stripped from the ring. The circuit comprises of a 16-baud shift register A, a 16-baud shift register B, an elastic buffer and a multiplexor. The shift registers, buffer and multiplexor are connected in series between a conductors identified by numerals 1 and 2, respectively. Conductor 1 interconnects register A to the upstream segment of the ring while conductor 2 interconnects the multiplexor to the downstream ring segment of the ring. The multiplexor includes a double throw switching element which can be placed on terminals a or b, depending on whether the monitor station is stripping fragments from the ring or acting in a repeat mode where it is passing information through the ring.

A receive clock identified by numeral 100 is connected to conductor 1 at its input and its output is connected to one of the inputs of register A via conductor 3. A transmit clock identified by numeral 102 has its output connected to the input of idle sequence generator 104 via conductor 4. The output of idle sequence generator 104 is connected by conductor 106 to terminal a of the multiplexor. A plurality of conductors identified by numeral 105 interconnects register A to PCF-0 compare 108. Two outputs from PCF-0 compare 108 are connected via conductors 7 and 8, respectively, to start-old frame compare 110 and start new frame compare 112. The output from start-old frame compare output 110 is fed over conductor 9 to the input of the multiplexor. Likewise, the output from start new frame compare 112 is fed over conductor 10 to another terminal of the multiplexor.

A plurality of conductors identified by numeral 114 couple PCF-0 compare 108 to E-DEL compare 116. The output from E-DEL compare 116 is fed over conductor 6 to explicit abort compare 118. The output from explicit abort compare 118 is sent over a conductor 9 into the multiplexor.

In operation, transmitted information reaches a monitor station from the upstream ring segment via conductor 1 (FIG. 10). The information then flows through register A and register B, then through an elastic buffer followed by the multiplexor element. As stated before, the multiplexor element is a 2-position switch. Finally, the information exits the switch onto conductor 2 to the downstream ring segment. When differential Manchester encoding is used in the ring, the monitor station will convert receive signals into "transitional code," with two bauds corresponding to each data bit.

When there is no traffic in the ring or when the monitor station is not performing a stripping function, the multiplexor switch is set to position a, and the monitor station (not shown) transmits a series of idle octets to the downstream ring segment.

When the monitor station is forwarding an incoming frame, the switch in the multiplexor is set to position b, and the frame passes through the station and is retransmitted on the downstream ring segment after a delay of approximately 16 bit-times.

The receive clock 100 produces a clock on conductor 3 that is synchronized to the transitions in the incoming signals received from the upstream ring segment. The clock on conductor 3 is used to shift the transitional encoded information through registers A and B, respectively. The clock also activates the idle compare and S-DEL compare and causes the contents of register B to be examined for the presence of an idle or start delimiter pattern.

If an idle pattern is detected, a control signal is supplied to the multiplexor on conductor 9 and causes the switch to move to position a. This causes the transmission of idle octets on the downstream ring segment.

If a start delimiter is detected, a signal on conductor 5 activates the E-DEL compare and PCF-0 compare and causes the contents of register A to be examined. If register A contains an end delimiter, a signal is outputted on conductor 6 and is supplied to the explicit abort compare 118. The explicit abort compare 118 then supplies the control signal on conductor 9 to the multiplexor causing the switch to be set to position a. The monitor station now transmits the idle pattern to the downstream ring segment, and the explicit abort sequence will be stripped.

If register A contains a PCF-0 octet, the state of the M-bit is examined. If the M-bit is set to 1, then a signal on conductor 7 is supplied to the start of old frame compare element. The latter element then supplies a control signal, on conductor 9 to the multiplexor causing the switch to be set to position a. The monitor station now overwrites the old message with idle patterns. If the M-bit (FIG. 8) is set at 0, then a signal on conductor 8 (FIG. 10) is supplied to the start new frame compare 110 which supplies the control signal on conductor 10 to the multiplexor causing the switch to be set to position b. The monitor station now retransmits the incoming frame from the upstream ring segment.

Figure 11:
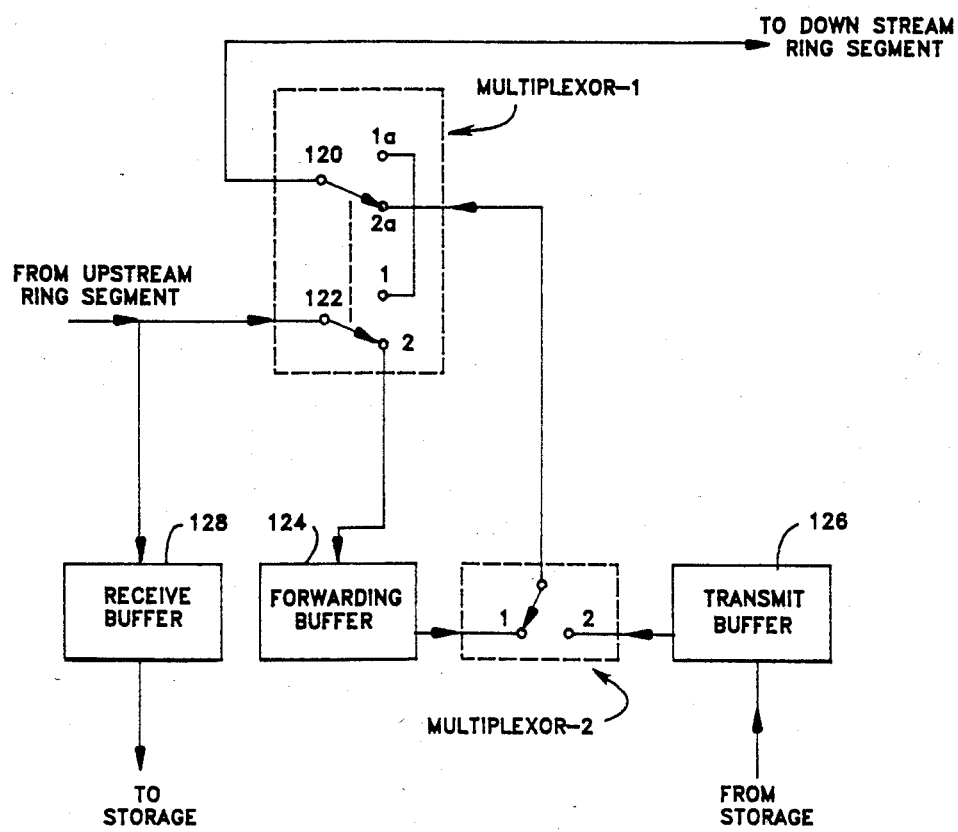
FIG. 11 is a block diagram showing the arrangement for the buffers of a register-insertion station.

FIG. 11 shows the working buffer configuration for a register-insertion station. The configuration includes a multiplexor-1 interconnecting an upstream ring segment to a downstream ring segment. The multiplexor-1 has two single pole double throw switch elements identified by numerals 120 and 122. Switch element 120 attaches terminals 1a or 2a to the downstream ring segment. Likewise, switch element 122 interconnects terminal 1 or 2 to the upstream segment of the ring. Forwarding buffer 124 is connected to terminal 2. Multiplexor 2 connects the outputs of forwarding buffer 124 and transmit buffer 126 to terminal 2a. The input to the transmit buffer is from local storage of an attached device (not shown). Receive buffer 128 is connected to the input of multiplexor 1.

In operation, the receive buffer copies the initial portion of a frame until the destination address field has been received from the upstream ring segment. The destination address is examined to determined whether or not it matches the address of the station. If the address matches either the specific address or a group address that is recognized by this ring station, the remainder of the frame is copied, and subsequently is transferred to the station's storage. (Where the copying is based on the recognition of the specific address, the station performs certain stripping actions that are described later.) If the destination address is not recognized by the station, then the copied portion of the physical header is cleared from the receive buffer, and the remainder of the frame is ignored by the receive buffer.

Multiplexor 2 gives preference to the forwarding buffer over the transmit buffer when both buffers contend to gain access to the ring. However, once the transmit buffer is given access to the ring (the switch of multiplexor-2 is in position 2), the transmit buffer is allowed to complete the transmission of the current frame before the switch is returned to position 1.

The forwarding buffer has sufficient capacity to store a frame. If this buffer is not empty, then switch 122 is set to position 2. Any frame that arrives from the upstream ring segment at this time will be stored into the forwarding buffer, in a FIFO manner. (Stripped portions of a frame are not stored.) If the forwarding buffer is empty, and if no frame is currently being transmitted from the transmit buffer, then the switch of multiplexor-1 is set to position 1. Any frame that arrives from the upstream ring segment at this time will pass directly to the downstream ring segment, bypassing the forward buffer. (Stripped portions of a frame are not retransmitted.)

A frame that is stored in the transmit buffer can only gain access to the ring when the forwarding buffer is empty, and when also no frame is currently being received from the upstream ring segment. At this time the switches of multiplexor-1 and multiplexor-2 are both set to positions 2 and 2a, respectively, and the station begins to send the frame that was stored in the transmit buffer. Once this frame has been sent, the transmit buffer reverts to a state of having the lowest priority for gaining access to the ring.

Figure 4:
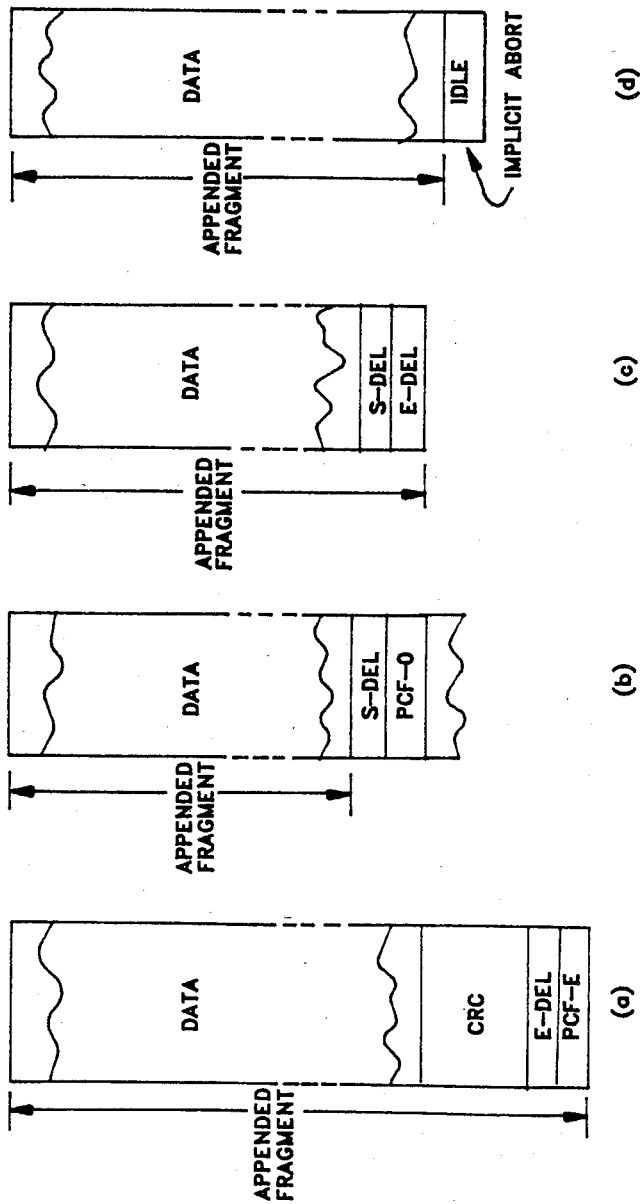
FIGS. 4(a)–4(d) show graphical representations for appended fragments.

FIGS. 4(a–d) shows some examples of message fragments which may circulate on the ring. These message fragments are called appended fragments and are removed by the origination station and/or the destination station. As can be gleamed from the above, the register-insertion ring with distributive stripping requires that stripping functions be performed at three types of stations, namely: monitor station; frame origination station; frame destination station.

The monitor station is responsible for stripping the message fragment consisting of the physical header plus, if present, the explicit abort sequence. The format of the message fragment that is stripped by the monitor station is shown in FIGS. 9a–9c.

The portion of the original message that is not stripped by the monitor station is termed the "appended fragment" and is described with reference to FIGS. 4a–4c.

The origination station, on a register-insertion ring, is responsible for stripping the appended fragment under the following conditions:

(a) The message was addressed to a specific destination station, but that station failed to strip the appended fragment.
(b) The message was multicast to a group of stations, and therefore was not stripped by any of the target stations.

The destination station, in a register-insertion ring, is responsible for stripping the appended fragment of a message that is specifically addressed to this station.

Figure 12:
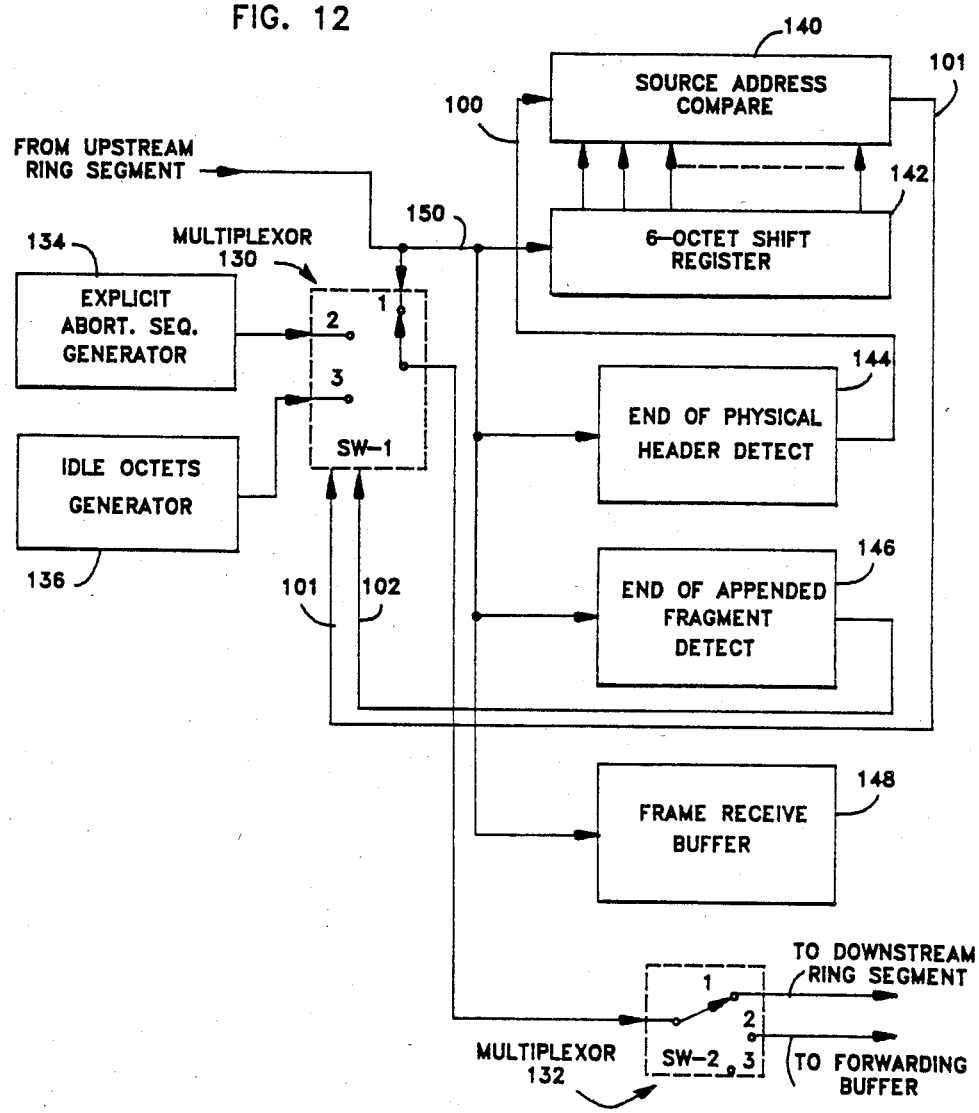
FIG. 12 is a block diagram of the stripping elements of an origination station.

FIG. 12 shows a block diagram of the logic circuit which performs the stripping function at an origination station. The circuit includes multiplexors 130 and 132 which are connected in series and which interconnect the upstream ring segment to the downstream ring segment. Multiplexor 130 includes a multi-position single throw switch 1. Explicit abort sequence generator 134 and idle octet generator 136 are connected to terminals 2 and 3, respectively. Blocks 140–148 are connected by conductor 150 to position 1 and the upstream ring segment. The output of block 144 is tied to the input of block 140 and causes a comparison to occur when Register 142 contains the source address of a frame. The outputs of blocks 140 and 146 are tied to multiplexor 1.

Every station on a register-insertion ring, including the frame origination station, examines the 6-octet source address field in the physical header of each frame that is received from the upstream ring segment. If a station recognizes its own specific address in the source address field, then the station either inserts an explicit abort sequence following the physical header, and then begins to overwrite the appended fragment with idle octets, or else the station causes an implicit abort by beginning the writing of idle octets with the first octet that follows the physical header. Stripping continues until the station detects the end of the appended fragment.

If, while the stripping action is being carried out, the station is not transmitting any information to the downstream ring segment from either its transmit buffer or its forwarding buffer, then switch 1 of the multiplexor 130 is set to position 3, and switch 2 (multiplexor 132) is set to position 1 while the stripping is underway. This results in idle octets being transmitted to the downstream ring segment. If, while the stripping action is being carried out, the station is transmitting from either the transmit buffer or the forwarding buffer, then switch 2 of multiplexor 132 is set to position 3, and the idle octets from the multiplexor 130 go nowhere.

It should be noted that block 144 includes a counter that indicates the receipt of the 13th octet following receipt of a start of message sequence. Similarly, block 146 detects explicit abort, implicit abort, start of new message, or end of physical trailer sequence.

FIG. 13 is a block diagram of the logic circuit which performs the stripping function in the destination station of a register-insertion ring. The circuit includes multiplexors 130' and 132' which are connected in series and which interconnect the upstream segment to the downstream segment. Multiplexor 130' includes a multi-position single throw switch 1'. Explicit abort sequence generator 134' and idle octet generator 136' are connected to terminals 2' and 3', respectively. Blocks 140'–148' are connected by conductor 150' to position 1' and the upstream ring segment. The output of block 144' is tied to the input of block 140' and causes a comparison to occur when Register 142' contains the source address of a frame. The outputs of blocks 140' and 146' are tied to multiplexor 130'. The end of destination address field detect means 144' is a counter that indicates the receipt of the 7th octet following receipt of a start of message sequence. Likewise, the end of appended fragment detect means 146' detects the explicit abort, implicit abort, start of new message, or end of physical trailer sequence.

The destination station on a register-insertion ring examines the 6-octet destination address field of each frame that is received from the upstream ring segment. If the station recognizes its own specific address in the destination address field of the physical header, the station either inserts an explicit abort sequence following the physical header, and begins to overwrite the appended fragment with idle octets, or else the station causes an implicit abort by beginning to write idle octets starting with the first octet that follows the physical header. Stripping continues until the end of the appended fragment is detected.

If, while the stripping action is being carried out, the station is not transmitting any information to the downstream ring segment from either its transmit buffer or its forwarding buffer, then switch 1 of the multiplexor 130' is set to position 3', and switch 2' of multiplexor 132' is set to position 1' while the stripping is underway. This results in idle octets being transmitted to the downstream ring segment. If, while the stripping action is being carried out, the station is transmitting from either the transmit buffer or the forwarding buffer, then switch 2' of multiplexor 132' is set to position 3', and the idle octets from multiplexor go nowhere.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. A method for removing expendable messages from a communications network comprising the steps of:
   (a) generating a message including a source address, a destination address and a control indicia set to a first state;
   (b) transmitting the message onto the network;
   (c) receiving the message at a first station other than the transmitting station;
   (d) examining a portion of the message at the first station for determining the state of the indicia and changing the state of said indicia to a second state if it was in the first state when received;
   (e) at a destination station
      (i) recognizing the destination address,
      (ii) copying the message,
      (iii) stripping a portion of the message from the network;
   (f) monitoring the input to the first station to detect a first predetermined bit sequence;
   (g) buffering a portion of the predetermined bit sequence at the first station; and
   (h) examining the control indicia and stripping the remaining portion of the message only if the control indicia is in the second state.

2. The method of claim 1 wherein the stripping includes the process of inserting idle characters onto the network.

3. The method of claim 1 wherein the station of steps (g) and (h) continue to strip until it detects a second predetermined bit sequence.

4. The method of claim 3 wherein the second predetermined bit sequence includes an idle sequence and/or a start delimiter sequence.

5. The method of claim 1 wherein the first predetermined bit sequence includes a start delimiter bit sequence.

6. The method of claim 1 wherein the destination station strips the portion of the message appended to the destination address.

7. A method for removing expendable messages from a communications network comprising the steps of:
 (a) generating a message including a source address, a destination address and a control indicia set to a first state;
 (b) transmitting the message onto the network;
 (c) receiving the message at a first station other than the transmitting station;
 (d) examining a portion of the message at the first station for determining the state of the indicia and changing the state of said indicia to a second state if it was in the first state when received;
 (e) at the generating station
  (i) recognizing the source address,
  (ii) stripping a portion of the message from the network;
 (f) monitoring the input to the first station to detect a first predetermined bit sequence;
 (g) buffering a portion of the predetermined bit sequence at the first station; and
 (h) examining the control indicia and stripping the remaining portion of the message only if the control indicia is in the second state.

8. The method of claim 7 wherein the origination station strips the portion of the message appended to the source address.

9. In a ring communications network system wherein one or more stations are coupled serially to a ring with each station being operable to accept messages from locally connected devices and placing said messages on the ring for delivery to a remote device and operable to receive messages from the ring and delivering said messages to the locally connected devices a method for stripping expendable messages from the ring comprising the steps of:
 (a) transmitting from one of said stations a message including the identity of the source of the message, the identity of the destination of the message and a control indicia being set in a first state;
 (b) at each station, buffering a predetermined portion of the message; comparing a selected portion of the buffered message with the station's identity to determine a recipient station;
 (c) inserting idle characters on the ring from the recipient station;
 (d) monitoring the input at a predefined station to detect a predetermined bit sequence;
 (e) buffering, at the predefined station, a selected portion of the predetermined bit sequence and bits thereafter;
 (f) examining the buffered bits to determine the status of the control indicia and stripping the buffered bits when the control indicia is different from the first state.

10. The method of claim 9 further including the steps of:
 (g) monitoring the ring to detect an explicit abort sequence, an implicit abort sequence, a start of new message sequence, or end of physical trailer sequence; and
 (h) continue to insert idle characters until one of the sequences in step (g) is detected.

11. The method of claim 9 further including the steps of monitoring the ring at the predefined station to detect a start delimiter sequence; and
 stripping the buffered bits in step (e) from the start delimiter sequence until one of the sequences in claim 10 is detected.

12. The method recited in steps (d) and (f) of claim 7 wherein the predefined station is a monitor station.

13. In a ring communication network system wherein one or more stations are coupled serially to a ring with each station being operable to accept messages from locally connected devices and placing said messages on the ring for delivery to a remote device and operable to receive messages from the ring and delivering said messages to the locally connected devices a method for stripping expendable messages from the ring comprising the steps of:
 (a) transmitting from one of said stations a message including the identity of the source of the message, the identity of the destination of the message and a control indicia being set in a first state;
 (b) receiving at the transmitting station the transmitted message;
 (c) buffering at said transmitting station, a portion of the received message;
 (d) correlating a selected portion of the buffered message with the address of the transmitting station;
 (e) stripping a portion of the message if the station's address correlates with the selected portion of the buffered message;
 (f) monitoring the input at a predefined station to detect a predetermined bit sequence;
 (g) buffering, at the predefined station a selected portion of the predetermined bit sequence; and
 (h) examining the buffered bits to determine the status of the control indicia and stripping the buffered bits when the control indicia is different from the first state.

14. The method of claim 13 further including the steps of:
 (i) monitoring the ring to detect an explicit abort sequence, an implicit abort sequence, a start of message sequence or end of physical header sequence; and
 (j) continue to insert idle characters until one of the sequences in step (d) is detected.

15. The method of claim 13 further including the steps of monitoring the ring at the predefined station to detect a start delimiter sequence; and
 stripping the buffered bits in step (e) from the start delimiter sequence until one of the sequences in claim 14 is detected.

16. The method of claim 13 wherein the portion of the message being stripped in step (e) includes the octet following the source address.

17. In a ring communications network system wherein one or more stations are coupled serially to a ring with each station being operable to accept messages from locally connected devices and placing said messages on the ring for delivery to a remote device and operable to receive messages from the ring and delivering said messages to the locally connected devices a method for stripping expendable messages from the ring comprising the steps of:

(a) transmitting from one of said stations a message including the identity of the source of the message, the identity of the destination of the message and a control indicia being set in a first state;

(b) receiving the transmitted message at a selected station;

(c) buffering a portion of said receive message;

(d) correlating a selected portion of the buffered message with the address of the selected station;

(e) stripping a portion of the message if the address of the selected station correlates with the selected portion of the buffered message;

(f) monitoring the input at a predefined station to detect a predetermined bit sequence;

(g) buffering at the predefined station a selected portion of the predetermined bit sequence; and (h) examining the buffered bits to determine the status of the control indicia and stripping the buffered bits when the control indicia is different from the first state.

18. In a ring communications network system wherein one or more stations are coupled serially to a ring with each station being operable to accept messages from locally connected devices and placing said messages on the ring for delivery to a remote device and operable to receive messages from the ring and delivering said messages to the locally connected devices an apparatus for stripping expendable messages from the ring comprising the steps of:

(a) means for transmitting from one of said stations a message including the identity of the source of the message, the identity of the destination of the message and a control indicia being set in a first state;

(b) means for receiving the transmitted message at a selected station;

(c) means for buffering a portion of said receive message;

(d) means for correlating a selected portion of the buffered message with the address of the selected station;

(e) means for stripping a portion of the message if the address of the selected station correlates with the selected portion of the buffered message;

(f) means for monitoring the input at a predefined station to detect a predetermined bit sequence;

(g) means for buffering at the predefined station a selected portion of the predetermined bit sequence; and (h) means for examining the buffered bits to determine the status of the control indicia; and means for stripping the buffered bits when the control indicia is different from the first state.

19. A method for stripping expended messages from a communications network comprising the steps of:

(a) transmitting from a first station a message including an identification label and a control indicia being set in a first state;

(b) receiving the message at a recipient station;

(c) stripping a portion of the message at the recipient station only if the identification label correlates with an identification characteristics of said recipient station;

(d) receiving a remaining portion of the message at a second station; and (e) stripping the remaining portion of said message only if the control indicia is set to a second state.

* * * * *